US007283059B2

(12) United States Patent
Harris et al.

(10) Patent No.: US 7,283,059 B2
(45) Date of Patent: Oct. 16, 2007

(54) REMOTE CONTROL MULTIMEDIA CONTENT LISTING SYSTEM

(75) Inventors: Glen McLean Harris, Mississauga (CA); Justin M. Henry, Mississagua (CA)

(73) Assignee: Logitech Europe S.A. (CH)

( * ) Notice: Subject to any disclaimer, the term of this patent is extended or adjusted under 35 U.S.C. 154(b) by 349 days.

(21) Appl. No.: 09/804,624

(22) Filed: Mar. 12, 2001

(65) Prior Publication Data

US 2001/0033244 A1 Oct. 25, 2001

Related U.S. Application Data

(60) Provisional application No. 60/189,487, filed on Mar. 15, 2000.

(51) Int. Cl.
*G08C 19/00* (2006.01)
*H04B 1/20* (2006.01)
*H04L 17/02* (2006.01)
*H04N 5/50* (2006.01)
*G06F 3/00* (2006.01)

(52) U.S. Cl. ........................... 340/825.69; 340/825.25; 341/176; 348/735; 725/43

(58) Field of Classification Search ........... 340/825.69, 340/825.25; 341/176; 359/148; 348/735; 725/43
See application file for complete search history.

(56) References Cited

U.S. PATENT DOCUMENTS 3,990,012 A 11/1976 Karnes
4,174,517 A 11/1979 Mandel
4,394,691 A 7/1983 Amano et al.
4,488,179 A 12/1984 Kruger et al.
4,566,034 A 1/1986 Harger et al. ............ 358/194.1

(Continued)

FOREIGN PATENT DOCUMENTS

CN 1399444 A 2/2003

(Continued)

OTHER PUBLICATIONS

Ciarcia, S., "Build a Trainable Infrared Master Controller," *Byte*, 12(3):113-123 (1987).

(Continued)

*Primary Examiner*—Jeffery Hofsass
*Assistant Examiner*—Scott Au
(74) *Attorney, Agent, or Firm*—Townsend and Townsend and Crew LLP

(57) ABSTRACT

A remote control multimedia content listing system for providing an updated content listing of various media within a remote control. The remote control multimedia content listing system includes a remote control having a housing, a display, a keypad, and an electronic system for receiving configuration data from a control station via a global computer network (e.g. Internet). The user may enter media information into the electronic system thereafter uploading the media information to the control station. The control station analyzes the uploaded media information and transmits the appropriate configuration data to properly configure the electronic system to provide a usable "guide" for the media. The user may also access a web site of the control station and manually enter the media information after which the control station sends the appropriate configuration data to the electronic system. The electronic system also preferably receives automatic updates of the configuration data when connected to the control station via the Internet for maintaining an updated multimedia listing.

17 Claims, 15 Drawing Sheets

U.S. PATENT DOCUMENTS

| | | | | |
|---|---|---|---|---|
| 4,626,848 | A | 12/1986 | Ehlers | |
| 4,837,627 | A | 6/1989 | Mengel | |
| 4,918,439 | A | 4/1990 | Wozniak et al. | |
| 4,959,810 | A | 9/1990 | Darbee et al. | |
| 5,109,222 | A | 4/1992 | Welty | |
| 5,140,326 | A | 8/1992 | Bacrania et al. | |
| 5,161,023 | A | 11/1992 | Keenan | |
| 5,228,077 | A | 7/1993 | Darbee | 379/102 |
| 5,255,313 | A | 10/1993 | Darbee | 379/102 |
| 5,374,999 | A | 12/1994 | Chuang et al. | |
| 5,410,326 | A | 4/1995 | Goldstein | 348/134 |
| 5,414,426 | A | 5/1995 | O'Donnell et al. | |
| 5,414,761 | A | 5/1995 | Darbee | 379/102 |
| 5,422,783 | A | 6/1995 | Darbee | |
| 5,481,251 | A | 1/1996 | Buys et al. | |
| 5,481,256 | A | 1/1996 | Darbee et al. | |
| 5,515,052 | A | 5/1996 | Darbee | |
| 5,537,463 | A | 7/1996 | Escobosa et al. | |
| 5,552,917 | A | 9/1996 | Darbee et al. | 359/148 |
| 5,568,367 | A | 10/1996 | Park | |
| 5,579,221 | A | 11/1996 | Mun | |
| 5,614,906 | A | 3/1997 | Hayes et al. | |
| 5,629,868 | A | 5/1997 | Tessier et al. | 364/514 |
| 5,671,267 | A * | 9/1997 | August et al. | 455/420 |
| 5,677,711 | A | 10/1997 | Kuo | |
| 5,689,353 | A | 11/1997 | Darbee et al. | 359/148 |
| 5,907,322 | A | 5/1999 | Kelly et al. | 345/327 |
| 5,943,228 | A | 8/1999 | Kim | 363/100 |
| 5,949,351 | A | 9/1999 | Hahm | 340/825.72 |
| 5,953,144 | A | 9/1999 | Darbee et al. | |
| 5,959,751 | A | 9/1999 | Darbee et al. | 359/148 |
| 6,002,450 | A | 12/1999 | Darbee et al. | 348/734 |
| 6,014,092 | A | 1/2000 | Darbee et al. | |
| 6,097,309 | A | 8/2000 | Hayes et al. | |
| 6,097,441 | A * | 8/2000 | Allport | 348/552 |
| 6,104,334 | A | 8/2000 | Allport | |
| 6,130,625 | A | 10/2000 | Harvey | 340/825.72 |
| 6,130,726 | A | 10/2000 | Darbee et al. | 348/734 |
| 6,133,847 | A | 10/2000 | Yang | 340/825.22 |
| 6,147,677 | A | 11/2000 | Escobosa et al. | |
| 6,154,204 | A | 11/2000 | Thompson et al. | 345/327 |
| 6,157,319 | A | 12/2000 | Johns et al. | |
| 6,169,451 | B1 | 1/2001 | Kim | |
| 6,173,330 | B1 * | 1/2001 | Guo et al. | 709/232 |
| 6,177,931 | B1 | 1/2001 | Alexander et al. | |
| 6,211,870 | B1 | 4/2001 | Foster | |
| 6,223,348 | B1 | 4/2001 | Hayes et al. | |
| 6,225,938 | B1 | 5/2001 | Hayes et al. | |
| 6,255,961 | B1 * | 7/2001 | Van Ryzin et al. | 340/825.25 |
| 6,271,831 | B1 | 8/2001 | Escobosa et al. | |
| 6,275,268 | B1 * | 8/2001 | Ellis et al. | 348/564 |
| 6,278,499 | B1 | 8/2001 | Darbee | |
| 6,288,799 | B1 * | 9/2001 | Sekiguchi | 358/468 |
| 6,374,404 | B1 * | 4/2002 | Brotz et al. | 725/46 |
| 6,496,135 | B1 | 12/2002 | Darbee | |
| 6,538,556 | B1 | 3/2003 | Kawajiri | |
| 6,563,430 | B1 | 5/2003 | Kemink et al. | 340/825.49 |
| 6,567,011 | B1 | 5/2003 | Young et al. | |
| 6,567,984 | B1 | 5/2003 | Allport | |
| 6,587,067 | B2 | 7/2003 | Darbee et al. | |
| 6,628,340 | B1 * | 9/2003 | Graczyk et al. | 348/552 |
| 6,629,077 | B1 | 9/2003 | Arling et al. | |
| 6,640,144 | B1 | 10/2003 | Huang et al. | |
| 6,642,852 | B2 | 11/2003 | Dresti et al. | |
| 6,657,679 | B2 | 12/2003 | Hayes et al. | |
| 6,690,290 | B2 | 2/2004 | Young et al. | |
| 6,720,904 | B1 | 4/2004 | Darbee | |
| 6,724,339 | B2 | 4/2004 | Conway et al. | |
| 6,747,591 | B1 | 6/2004 | Lilleness et al. | |
| 6,748,248 | B1 | 6/2004 | Pan et al. | |
| 6,781,638 | B1 | 8/2004 | Hayes | |
| 6,785,579 | B2 | 8/2004 | Huang et al. | |
| 6,788,241 | B2 | 9/2004 | Arling et al. | |
| 6,829,512 | B2 | 12/2004 | Huang et al. | |
| 6,859,197 | B2 | 2/2005 | Klein et al. | |
| 6,870,463 | B2 | 3/2005 | Dresti et al. | |
| 6,917,302 | B2 | 7/2005 | Lilleness et al. | |
| 6,933,833 | B1 | 8/2005 | Darbee | |
| 6,946,988 | B2 | 9/2005 | Edwards et al. | |
| 6,947,101 | B2 | 9/2005 | Arling | |
| 6,968,570 | B2 | 11/2005 | Hayes et al. | |
| 2002/0056084 | A1 | 5/2002 | Harris et al. | |
| 2002/0190956 | A1 | 12/2002 | Hayes et al. | |
| 2003/0046579 | A1 | 3/2003 | Hayes et al. | |
| 2003/0095156 | A1 | 5/2003 | Klein et al. | |
| 2003/0103088 | A1 | 6/2003 | Dresti et al. | |
| 2003/0164773 | A1 | 9/2003 | Young et al. | |
| 2003/0164787 | A1 | 9/2003 | Mauro et al. | |
| 2003/0189509 | A1 | 10/2003 | Hayes et al. | |
| 2003/0193519 | A1 | 10/2003 | Hayes et al. | |
| 2003/0233664 | A1 | 12/2003 | Huang et al. | |
| 2004/0046677 | A1 | 3/2004 | Mauro et al. | |
| 2004/0056789 | A1 | 3/2004 | Arling et al. | |
| 2004/0056984 | A1 | 3/2004 | Hayes et al. | |
| 2004/0070491 | A1 | 4/2004 | Huang et al. | |
| 2004/0093096 | A1 | 5/2004 | Huang et al. | |
| 2004/0169590 | A1 | 9/2004 | Haughawout et al. | |
| 2004/0169598 | A1 | 9/2004 | Arling et al. | |
| 2004/0189508 | A1 | 9/2004 | Nguyen | |
| 2004/0189509 | A1 | 9/2004 | Lilleness et al. | |
| 2004/0210933 | A1 | 10/2004 | Mauro et al. | |
| 2004/0246165 | A1 | 12/2004 | Conway et al. | |
| 2004/0263349 | A1 | 12/2004 | Haughawout et al. | |
| 2004/0266419 | A1 | 12/2004 | Arling et al. | |
| 2004/0268391 | A1 | 12/2004 | Clercq et al. | |
| 2005/0030196 | A1 | 2/2005 | Harris et al. | |
| 2005/0052423 | A1 | 3/2005 | Harris et al. | |
| 2005/0062614 | A1 | 3/2005 | Young | |
| 2005/0062636 | A1 | 3/2005 | Conway et al. | |
| 2005/0066370 | A1 | 3/2005 | Cesar et al. | |
| 2005/0078087 | A1 | 4/2005 | Gates et al. | |
| 2005/0088315 | A1 | 4/2005 | Klein et al. | |
| 2005/0094610 | A1 | 5/2005 | De Clerq et al. | |
| 2005/0096753 | A1 | 5/2005 | Arling et al. | |
| 2005/0116930 | A1 | 6/2005 | Gates | |
| 2005/0134578 | A1 | 6/2005 | Chambers et al. | |
| 2005/0162282 | A1 | 7/2005 | Mauro et al. | |
| 2005/0179559 | A1 | 8/2005 | Edwards et al. | |
| 2005/0200598 | A1 | 9/2005 | Hayes et al. | |
| 2005/0216606 | A1 | 9/2005 | Hayes et al. | |
| 2005/0216843 | A1 | 9/2005 | Masters et al. | |
| 2005/0231649 | A1 | 10/2005 | Arling | |

FOREIGN PATENT DOCUMENTS

| | | | |
|---|---|---|---|
| CN | 1434422 | A | 8/2003 |
| EP | 103 438 | A1 | 3/1984 |
| EP | 0 398 550 | | 11/1990 |
| EP | 1 014 577 | | 6/2000 |
| GB | 2081948 | A | 2/1982 |
| GB | 2175724 | A | 12/1986 |
| JP | 2002058079 | A | 2/2002 |
| JP | 2002271871 | A | 9/2002 |
| JP | 2003087881 | A | 3/2003 |
| WO | WO 01/69567 | A2 | 9/1991 |
| WO | WO 99/34564 | | 7/1999 |
| WO | WO 00/34851 | A1 | 6/2000 |
| WO | WO 03/045107 | A1 | 5/2003 |
| WO | WO 03/060804 | A1 | 7/2003 |

OTHER PUBLICATIONS

Ciarcia, S., *The Best of Ciarcia's Circuit Cellar*, pp. 345-354 (1987).

Konstan, J. A., "State problems in programming human-controlled devices," *Digest of Tech. Papers of Int. Conf. on Consumer Electronics (ICCE)*, pp. 122-123 (1994).

Press Release: "Philips Revolutionizes Home Theatre Control"; 1998, 3 pages.

"ProntoEdit User Manual"; 2002, http://www.pronto.philips.com/index.cfm?id=241, 85 pages.

"Pronto Review"; www.remotecentral.com/pronto/index.html, 3 pages.

Pronto link to downloadable files for components from different manufacturers; http://www.remotecentral.com/files/index.html, 3 pages.

Radio Shack, *Universal Remote Control Owners Manual*, pp. 1-19, (1987).

* cited by examiner

REMOTE CONTROL MULTIMEDIA CONTENT LISTING SYSTEM

CROSS REFERENCE TO RELATED U.S. PROVISIONAL PATENT APPLICATION

I hereby claim benefit under Title 35, United States Code, Section 119(e) of U.S. provisional patent application Ser. No. 60/189,487 filed Mar. 15, 2000. This application is a continuation of the application Ser. No. 60/189,487. The application Ser. No. 60/189,487 is now abandoned. The 60/189,487 application is hereby incorporated by reference into this patent application.

BACKGROUND OF THE INVENTION

1. Field of the Invention

The present invention relates generally to media guide systems and more specifically it relates to a remote control multimedia content listing system for providing an updated content listing of various media within a remote control.

2. Description of the Prior Art

Remote control devices have been in use for years. Remote control devices are utilized to operate various external electronic devices including but not limited to televisions, stereos, receivers, VCRs, DVD players, CD players storing multiple CDs, amplifiers, equalizers, tape players, cable units, lighting, window shades and other electronic devices. A conventional remote control is typically comprised of a housing structure, a keypad within the housing structure for entering commands by the user, electronic circuitry within the housing structure connected to the keypad, and a transmitter electrically connected to the electronic circuitry for transmitting a control signal to an electronic device to be operated.

The user depresses one or more buttons upon the keypad when a desired operation of a specific electronic device is desired. For example, if the user desires to turn the power off to a VCR, the user will depress the power button upon the remote control which transmits a "power off" control signal that is detected by the VCR resulting in the VCR turning off.

Because of the multiple electronic devices currently available within many homes and businesses today, a relatively new type of remote control is utilized to allow for the control of a plurality of electronic devices commonly referred to as a "universal remote control." Most universal remote controls have "selector buttons" that are associated with the specific electronic device to be controlled by the remote control (i.e. television, VCR, DVD player, etc.). Universal remote control devices allow for the control of a plurality of external electronic devices with a single remote control thereby eliminating the need to have a plurality of remote controls physically present within a room.

Because of the numerous electronic devices within a home today it is often times difficult for a user to remember the various programming and media materials available to them. Modern cable television networks now provide a television "guide" regarding the upcoming television programs. Digital television networks provide advanced search features for locating desirable programming. However, the user must typically switch the television channel to guide thereby interrupting the viewing of their current television program.

Many individuals also have CD changers and/or MP3 units that are capable of storing a plurality of music media. The main problem with conventional CD changers is that they are difficult to program an album and/or song information into requiring a plurality of tedious keystrokes entered into the keypad of the remote control. Hence there is a need for a convenient remote control system that is able to receive updated information regarding various media for use as a guide system.

While these devices and systems may be suitable for the particular purpose to which they address, they are not as suitable for providing an updated content listing of various media within a remote control. Conventional guide systems are not user friendly and often times are tedious to program and utilize.

In these respects, the remote control multimedia content listing system according to the present invention substantially departs from the conventional concepts and designs of the prior art, and in so doing provides an apparatus primarily developed for the purpose of providing an updated content listing of various media within a remote control.

SUMMARY OF THE INVENTION

In view of the foregoing disadvantages inherent in the known types of media guides now present in the prior art, the present invention provides a new remote control multimedia content listing system construction wherein the same can be utilized for providing an updated content listing of various media within a remote control.

The general purpose of the present invention, which will be described subsequently in greater detail, is to provide a new remote control multimedia content listing system that has many of the advantages of the remote controls and multimedia guides mentioned heretofore and many novel features that result in a new remote control multimedia content listing system which is not anticipated, rendered obvious, suggested, or even implied by any of the prior art multimedia guide systems, either alone or in any combination thereof.

To attain this, the present invention generally comprises a remote control having a housing, a display, a keypad, and an electronic system for receiving configuration data from a control station via a global computer network (e.g. Internet). The user may enter media information into the electronic system thereafter uploading the media information to the control station. The control station analyzes the uploaded media information and transmits the appropriate configuration data to properly configure the electronic system to provide a usable "guide" for the media. The user may also access a web site of the control station and manually enter the media information after which the control station sends the appropriate configuration data to the electronic system. The electronic system also preferably receives automatic updates of the configuration data when connected to the control station via the Internet for maintaining an updated multimedia listing.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a remote control multimedia content listing system that will overcome the shortcomings of the prior art devices.

A second object is to provide a remote control multimedia content listing system for providing an updated content listing of various media within a remote control.

Another object is to provide a remote control multimedia content listing system that allows a user to easily program media listings contained within their home.

An additional object is to provide a remote control multimedia content listing system that is easy to utilize.

A further object is to provide a remote control multimedia content listing system that allows an individual to quickly configure a universal remote control for various types of media including but not limited to movies, music and television programming.

Another object is to provide a remote control multimedia content listing system that is simple to utilize.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

Figure 1:
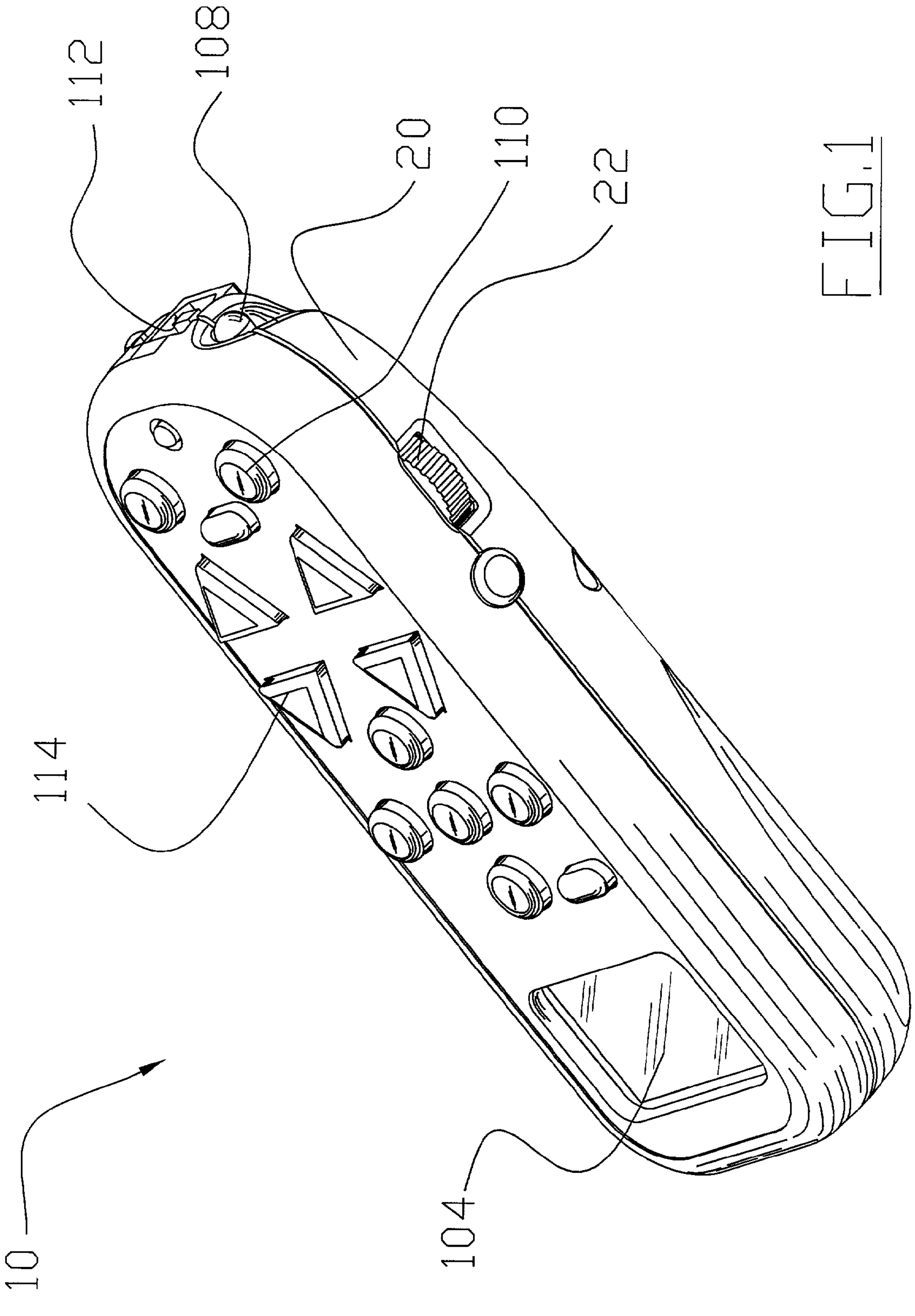
FIG. 1 is an upper perspective view of the present invention.
Figure 2:
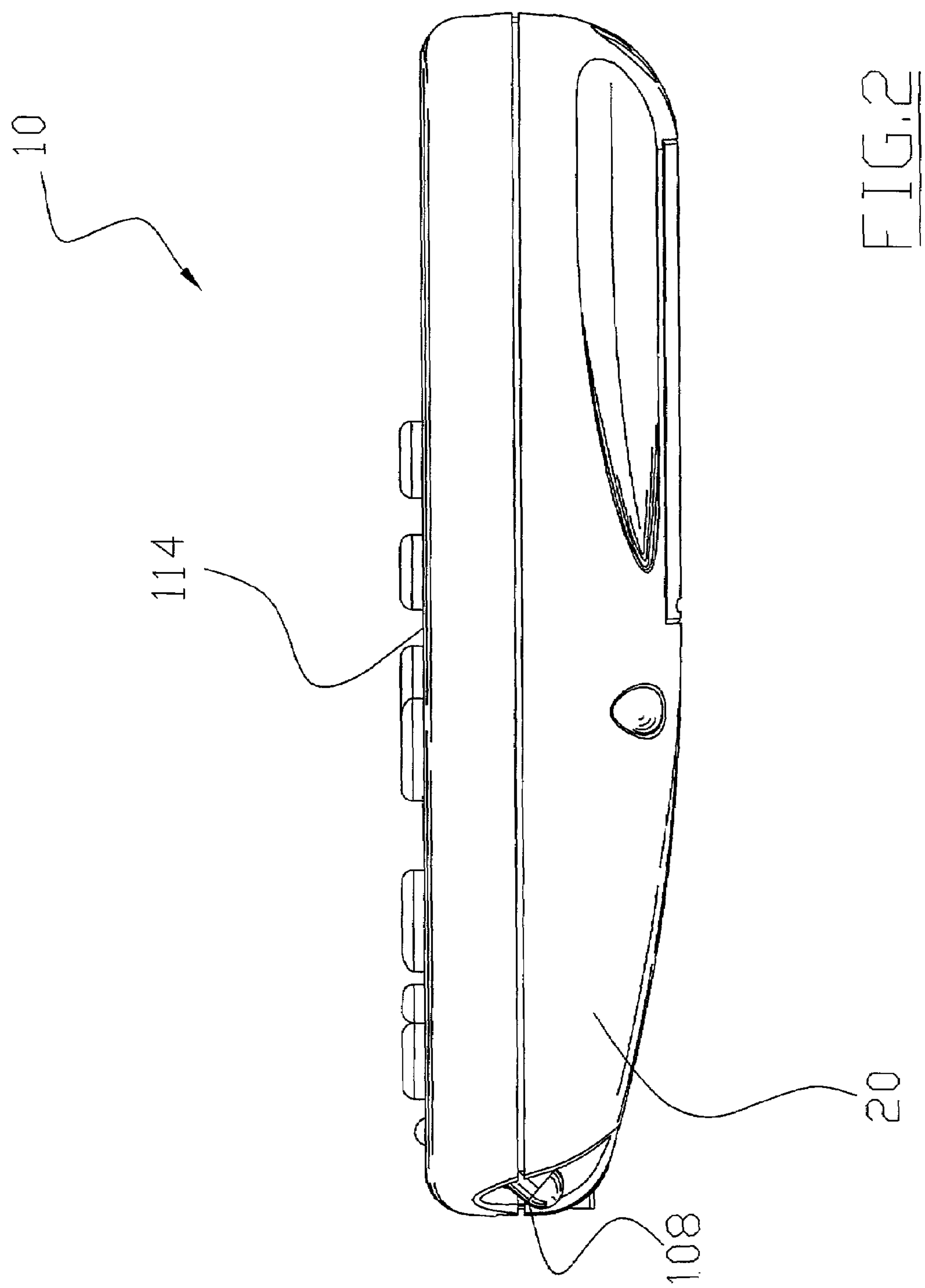
FIG. 2 is a side view of the present invention.
Figure 3:
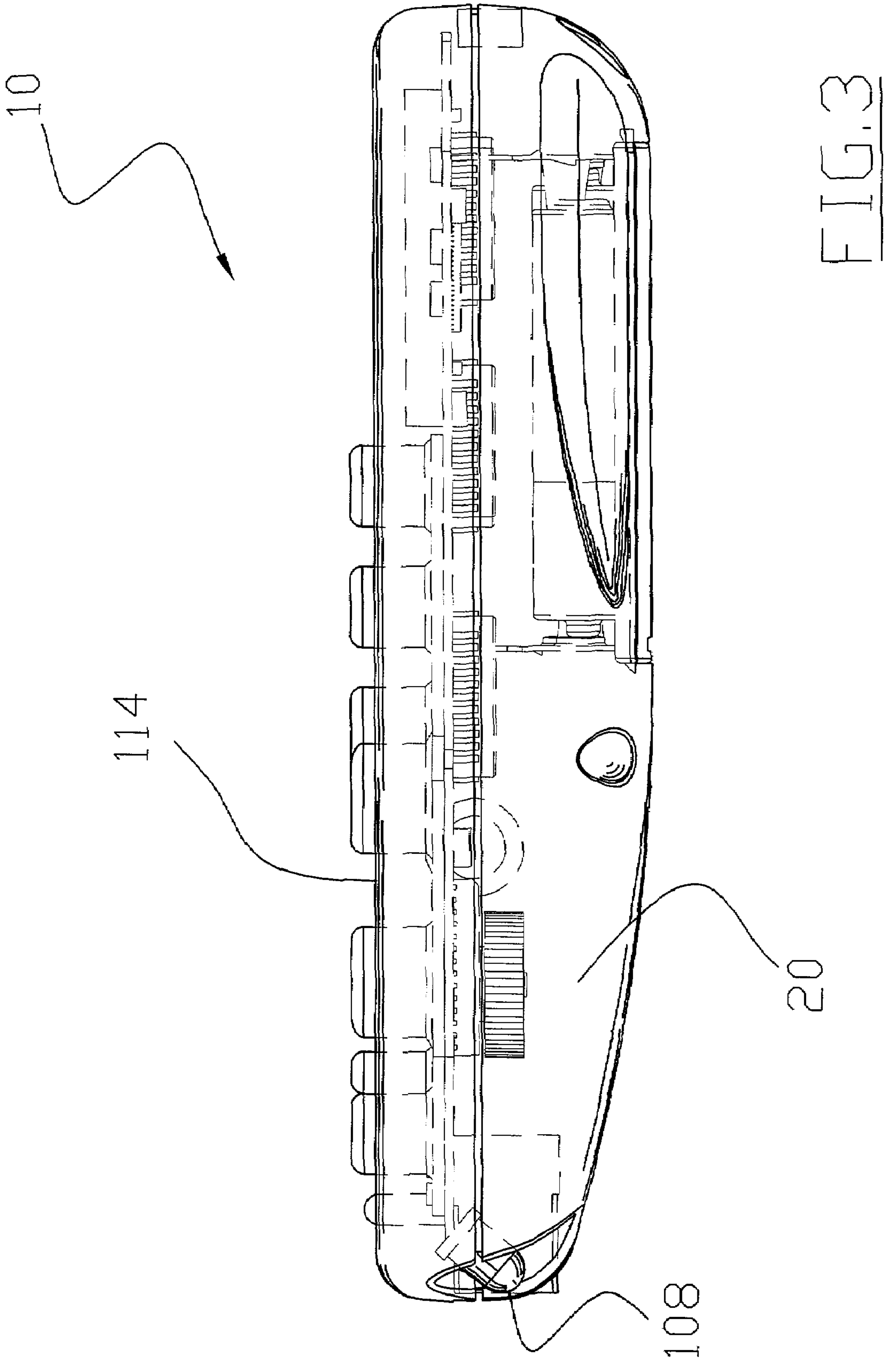
FIG. 3 is a side view of the present invention illustrating electronic circuitry within.
Figure 4:
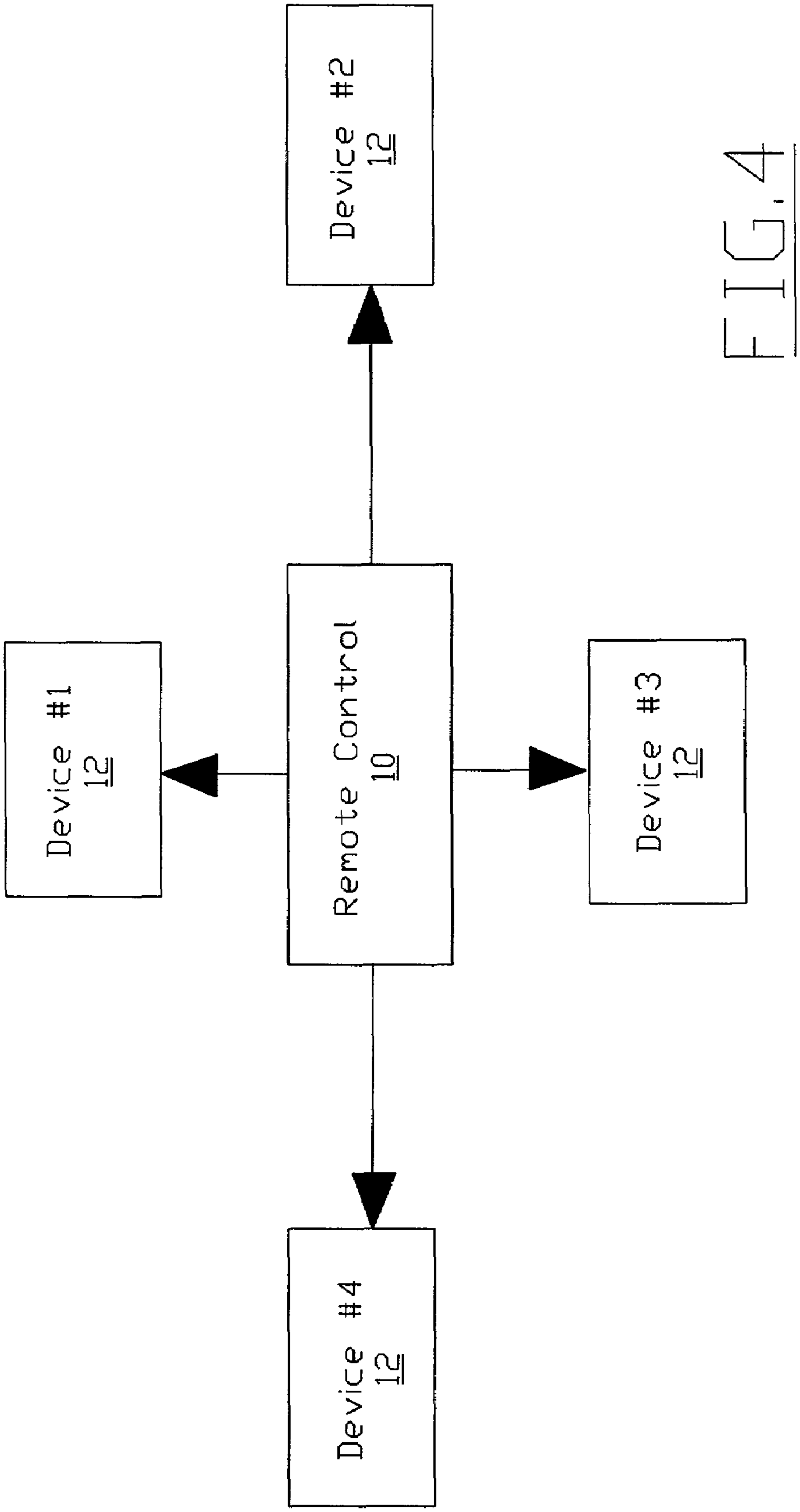
FIG. 4 is a block diagram illustrating the communications between the present invention and a plurality of external electronic devices.
Figure 5:
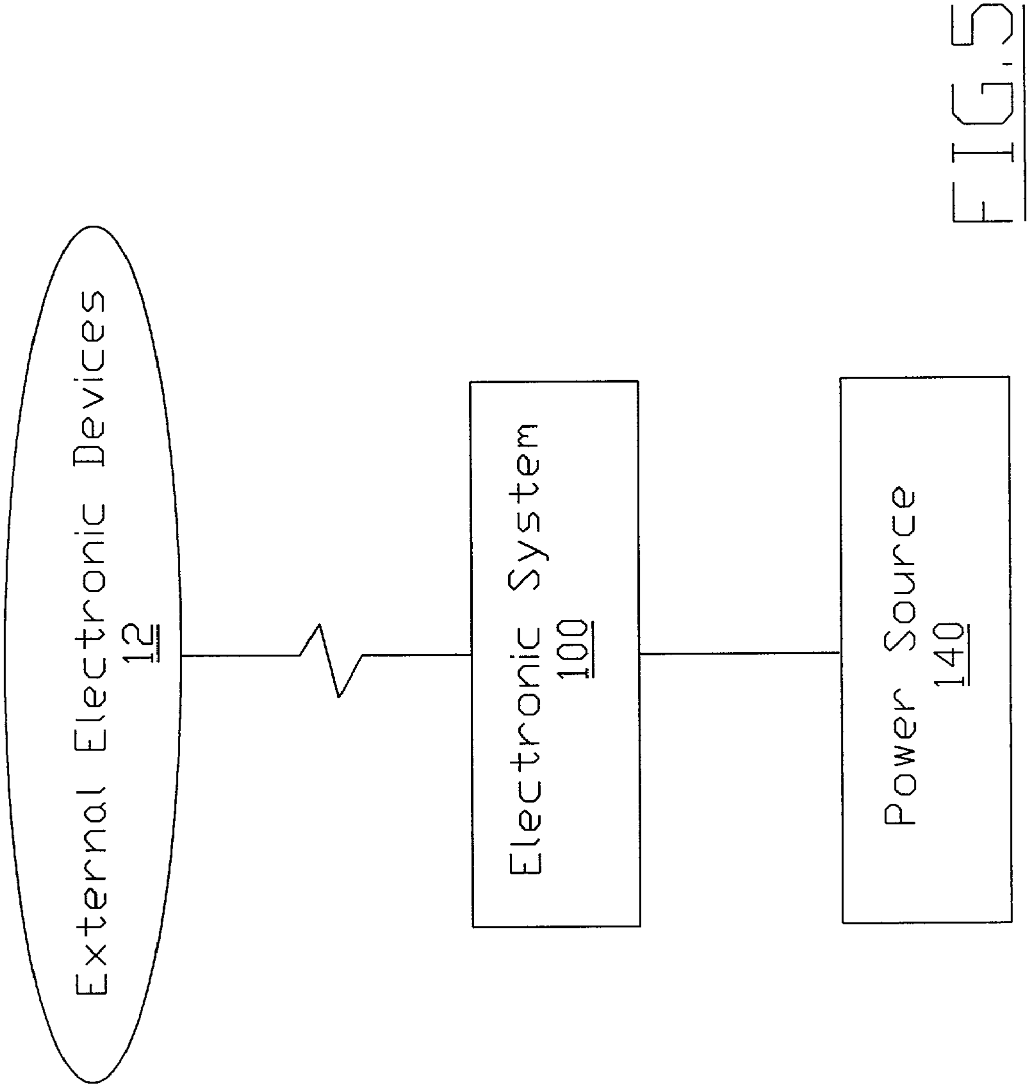
FIG. 5 is a block diagram illustrating the electronic system of the present invention electrically connected to the power source and in communication with the external electronic devices.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as but not limited to the Internet or wireless communications.

Turning now descriptively to the drawings, in which similar reference characters denote similar elements throughout the several views, FIGS. 1 through 15 illustrate remote control multimedia content listing system 10, which comprises a remote control having a housing, a display, a keypad, and an electronic system for receiving configuration data from a control station via a global computer network (e.g. Internet). The user may enter media information into the electronic system thereafter uploading the media information to the control station. The control station analyzes the uploaded media information and transmits the appropriate configuration data to properly configure the electronic system to provide a usable "guide" for the media. The user may also access a web site of the control station and manually enter the media information after which the control station sends the appropriate configuration data to the electronic system. The electronic system also preferably receives automatic updates of the configuration data when connected to the control station via the Internet for maintaining an updated multimedia listing.

A. Remote Control Structure

The present invention generally is comprised of a housing 20 having a structure and shape similar to conventional remote control devices. The housing 20 may be constructed of various types of materials and shapes as can be appreciated by one skilled in the art. The housing is preferably structured to be ergonomic for a majority of users.

The present invention may be utilized to control and operate various external electronic devices including but not limited to televisions, stereos, receivers, VCRs, DVD players, CD players, CD changers, amplifiers, equalizers, tape players, cable units, satellite dish receivers, lighting, window shades and other electronic devices. Almost any number of external electronic devices may be controlled by the present invention as can be accomplished with conventional remote control devices.

Figure 6:
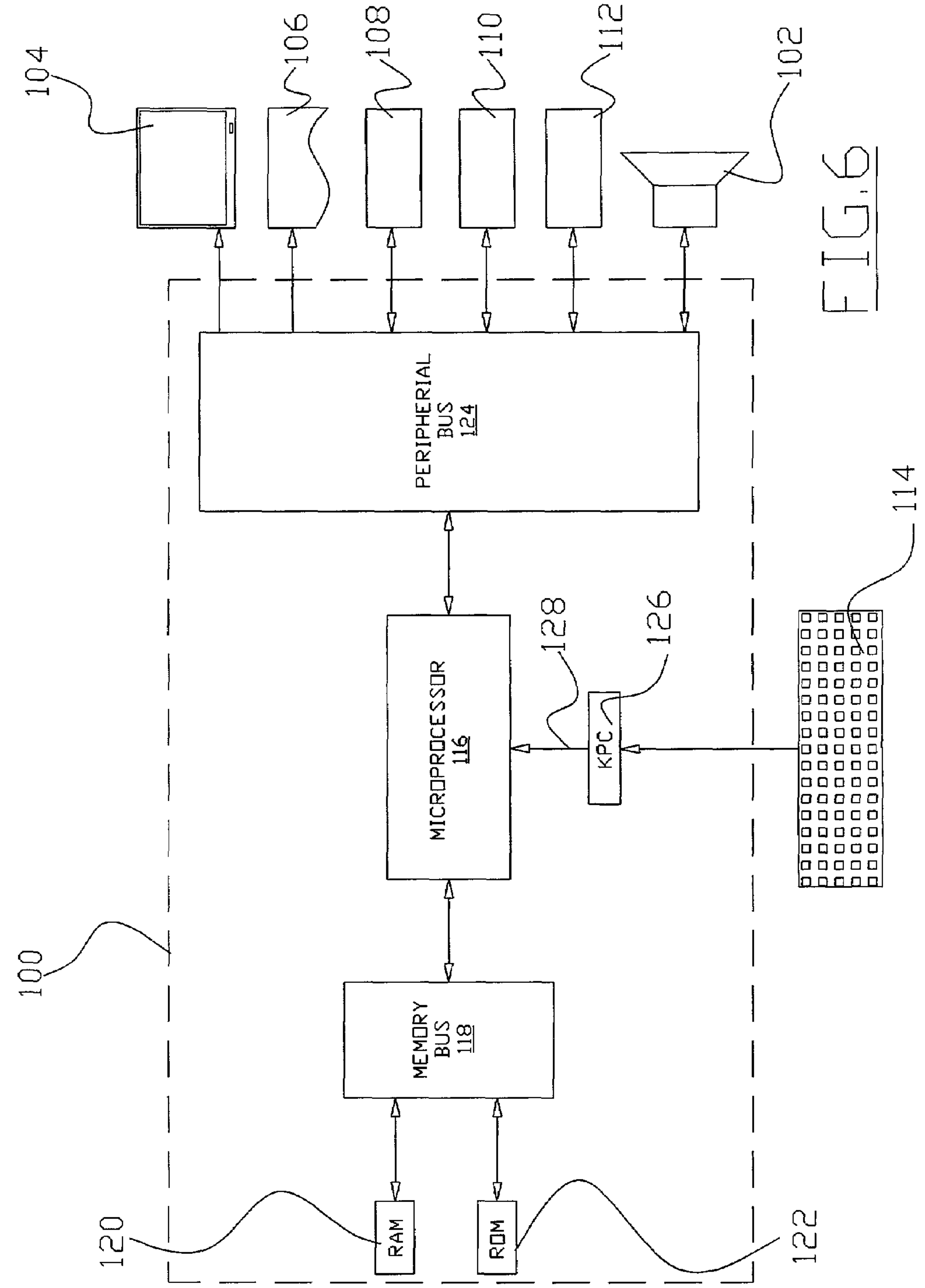
FIG. 6 is a block diagram illustrating the electronic system along with a plurality of accessory devices connected to thereof.

FIG. 6 is a block diagram of an exemplary electronic system 100 for practicing the various aspects of the present invention. The electronic system 100 is preferably enclosed within the housing. A portable power source 140 is electrically connected to the electronic system 100 for providing electrical power to the electronic system 100. The power source 140 may be comprised of any power source such as a battery structure (disposable or rechargeable), solar cells, or direct power.

The electronic system 100 preferably includes a display screen 104, a network interface 112, a keypad 114, a microprocessor 116, a memory bus 118, random access memory (RAM) 120, a speaker 102, read only memory (ROM) 122, a peripheral bus 124, a keypad controller 126, and a communications device 108. As can be appreciated, the electronic system 100 of the present invention may be comprised of any combination of well-known computer devices, personal digital assistants (PDAs), laptop computers, remote control devices and other electronic systems.

The microprocessor 116 is a general-purpose digital processor that controls the operation of the electronic system 100. Microprocessor 116 can be a single-chip processor or implemented with multiple components. Using instructions retrieved from memory, microprocessor 116 controls the reception and manipulations of input data and the output and display of data on output devices.

The memory bus 118 is utilized by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output and storage devices used by the electronic system 100. In the described embodiment(s), these devices include a display screen 104, an accessory device 106, a speaker 102, a communications device 108, and a network interface 112. A keypad controller 126 is used to receive input from the keypad 114 and send decoded symbols for each pressed key to microprocessor 116 over bus 128.

The display screen 104 is an output device that displays images of data provided by the microprocessor 116 via the peripheral bus 124 or provided by other components in the electronic system 100. The display screen 104 displays the media guide for the user to view and interact with using the keypad 114. The display screen may be comprised of any well-known display means such as LED, LCD or the like. Other output devices such as a printer, plotter, typesetter, etc. can be utilized as an accessory device 106 with the electronic system 100.

The microprocessor 116 together with an operating system operate to execute computer code and produce and use data. The computer code and data may reside on RAM 120, ROM 122, or other storage mediums. The computer code and data could also reside on a removable program medium and loaded or installed onto the electronic system 100 when needed. Removable program mediums include, for example, PCCARD, flash memory, and floppy disk.

Figure 7:
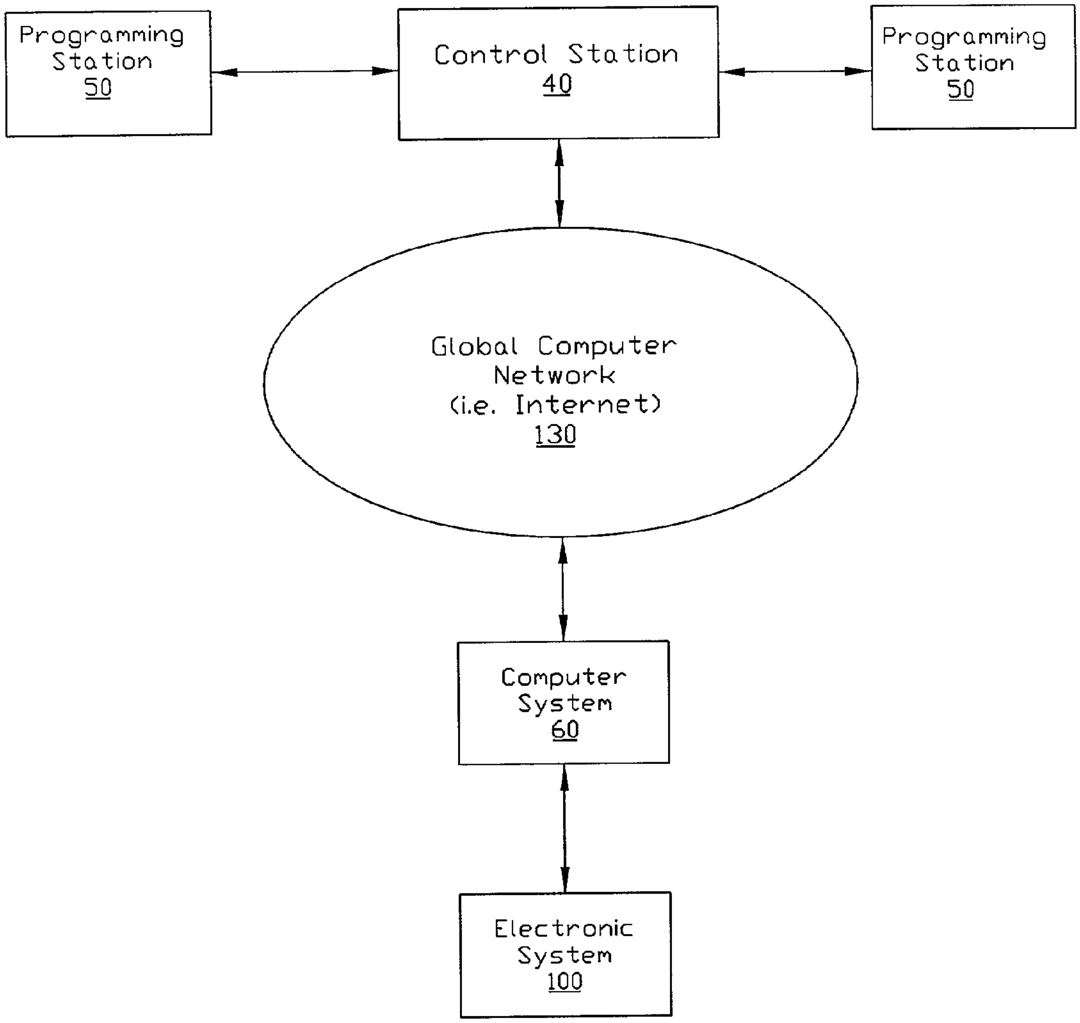
FIG. 7 is a block diagram of the present invention in communication with the control station via a global computer network wherein the electronic system is directly connected to an intermediary computer system.
Figure 8:
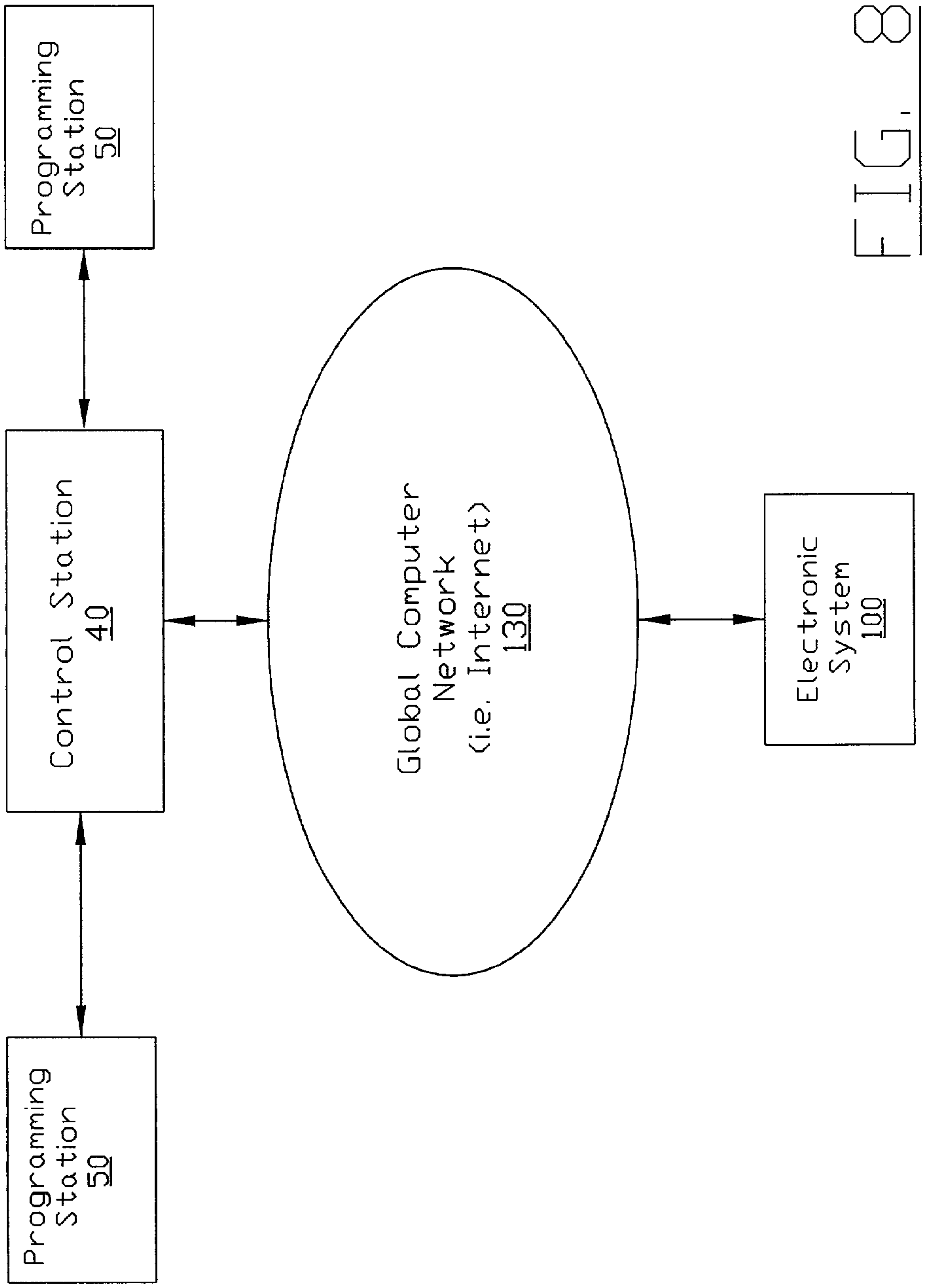
FIG. 8 is a block diagram of the present invention in communication with the control station directly via a global computer network without utilizing an intermediary computer system.
Figure 9:
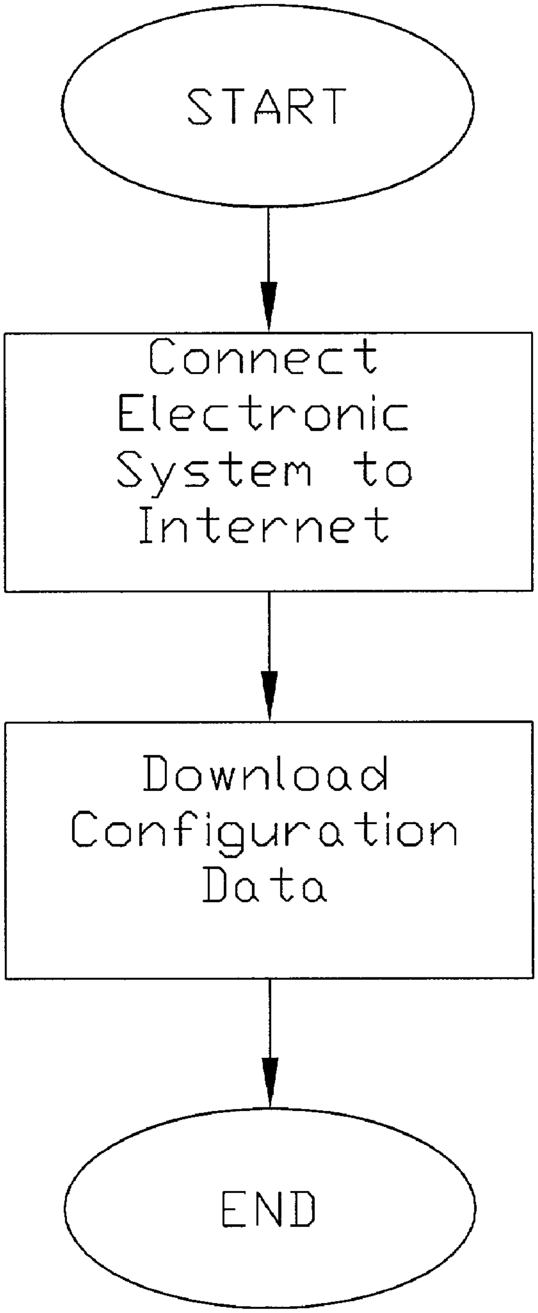
FIG. 9 is a flowchart illustrating the overall operation of the present invention for downloading the configuration data from the control station.
Figure 10:
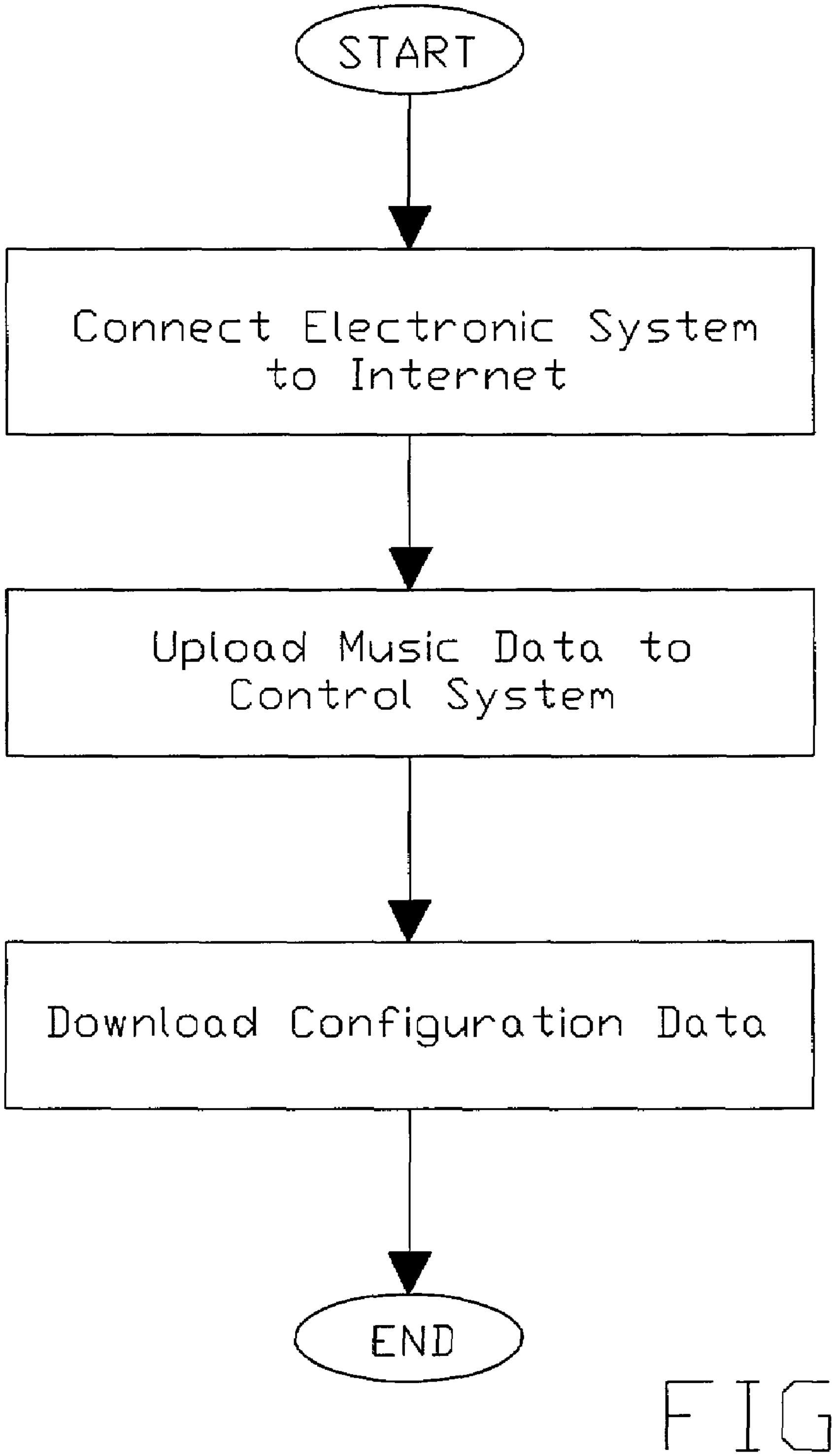
FIG. 10 is a flowchart illustrating the connecting to the control station for uploading music data and downloading configuration data.
Figure 11:
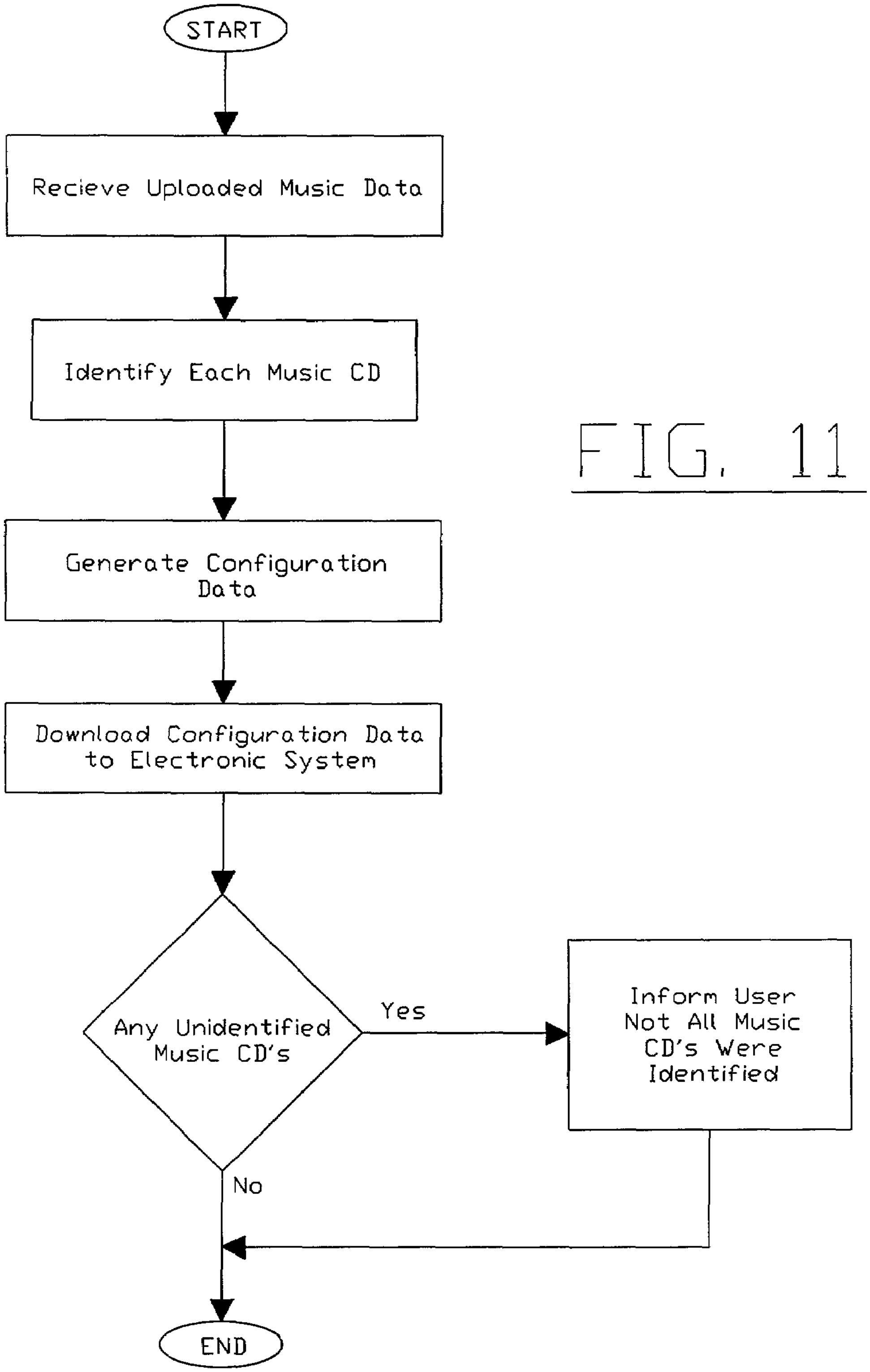
FIG. 11 is a flowchart illustrating the process of receiving the uploaded music data, determining the identity of each music CD and transferring the configuration data to the electronic system.
Figure 12:
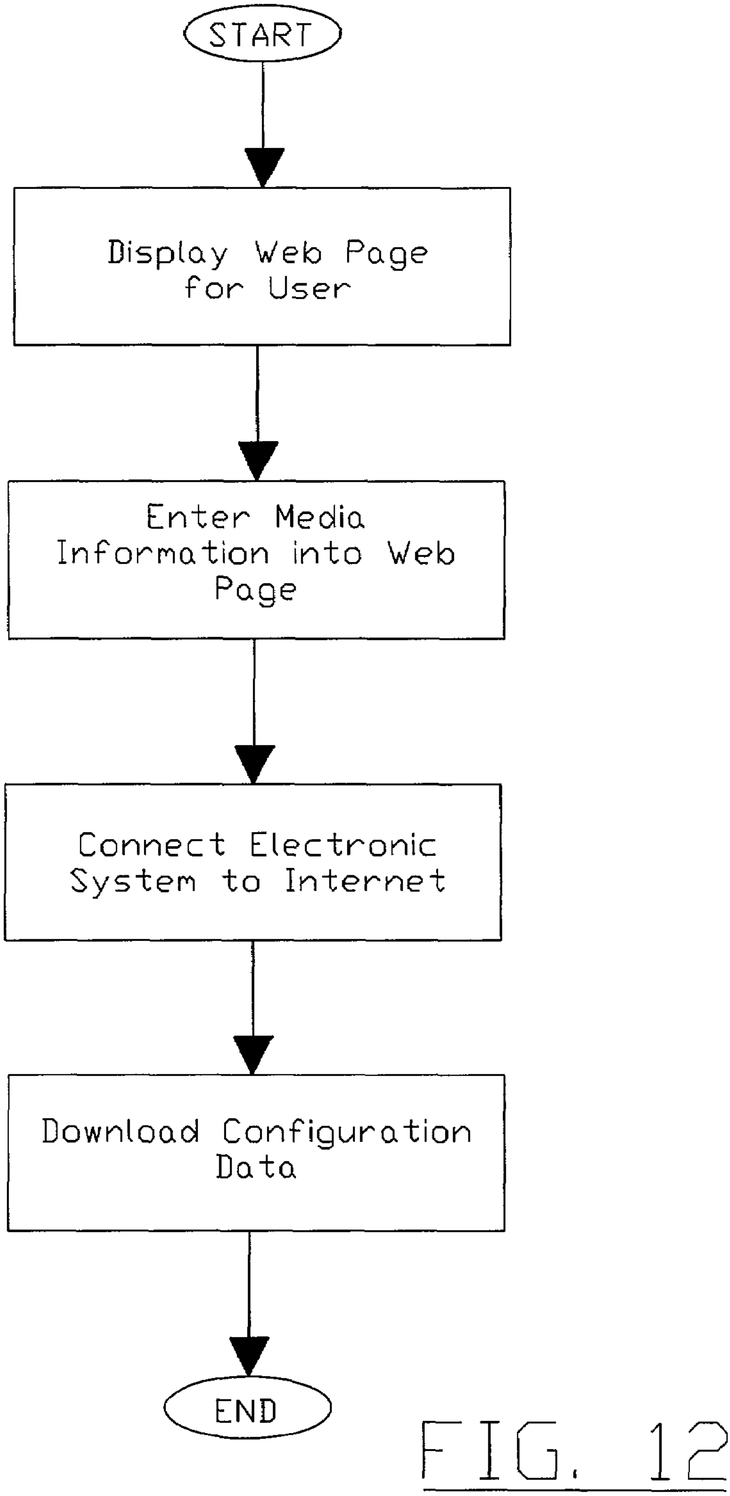
FIG. 12 is a flowchart illustrating the usage of a web page for entering media information into.

The network interface 112 is utilized to send and receive data over a network connected to other electronic systems. The network interface may also be comprised of a Universal Serial Bus (USB), an external bus standard that supports data transfer rates of 12 Mbps (12 million bits per second). A single USB port can be used to connect up to 127 peripheral devices, such as mice, modems, and keyboards. An interface card or similar device and appropriate software implemented by microprocessor 116 can be utilized to connect the electronic system 100 to an existing network and transfer data according to standard protocols including data over a global computer network such as the Internet. The electronic system 100 may connect to the Internet 130 via a computer system 60 or directly as illustrated in FIGS. 7 and 8 respectively.

The keypad 114 is used by a user to input commands and other instructions to the electronic system 100. Other types of user input devices can also be used in conjunction with the present invention. For example, pointing devices such as a computer mouse, a jog switch 22, a track ball, a stylus, or a tablet to manipulate a pointer on a screen of the electronic system 100. The user utilizes the keypad 114 to control the viewing and operation of the media guide of the display 104.

The present invention can also be embodied as computer readable code on a computer readable medium. The computer readable medium is any data storage device that can store data which can be thereafter be read by a electronic system. Examples of the computer readable medium include read-only memory, random-access memory, magnetic data storage devices such as diskettes, and optical data storage devices such as CD-ROMs. The computer readable medium can also be distributed over a network coupled electronic systems so that the computer readable code is stored and executed in a distributed fashion.

The communications device 108 may be comprised of any well-known communication system that allows communications with external electronic devices. The communications device 108 may provide for various types of communication such as but not limited to via infrared (IR), wireless (e.g. BLUETOOTH), unidirectional, bidirectional, radio frequency (RF), visible light, ultrasonic and various other means for communicating with external electronic devices. The communications device 108 may be capable of receiving a "signal sample" from another remote control wherein the signal sample is stored within the electronic system as is common with universal remote controls.

Input into the electronic system is accomplished mainly through the usage of the keypad 114. The keypad 114 includes a plurality of buttons that allow the user to execute one or more commands. The keypad 114 allows for the control of basic functions such as volume, channel manipulation, mute, and last channel. Various other input devices may be utilized to input data into the electronic system 100 such as a jog switch 22 (i.e. dial), motion and orientation detectors, touch sensitive screens and voice recognition. The display 104 provides information to the user such as possible tasks to complete or the current state of the external electronic devices.

B. Communication System

The present invention is best operated upon a global computer network such as the Internet 130. A plurality of computer systems around the world are in communication with one another via this global computer network.

The present invention preferably utilizes the Internet 130 for communications, however it can be appreciated that as future technologies are created that various aspects of the invention may be practiced with these improved technologies. In addition, wireless technologies provide a suitable communications medium for operating the present invention.

C. Web Page

The present invention is preferably utilized in conjunction with information presented upon a web page or other displayable medium representing the control station 40. A web page is typically comprised of a web page code that is stored upon a computer server. A typical web page includes textual, graphical and audio data within for display upon a computer system 60 and may be comprised of various formats.

The web page code may be formatted such as but not limited to HTML (HyperText Markup Language), XML (Extensible Markup Language), HDML (Handheld Device Markup Language), and WML (Wireless Markup Language) that is displayable upon a computer system. Scripts such as JavaScript may be included within the web page code to request the server computer to request a specific audio file to be played with respect to an advertisement. As can be appreciated, additional formats for the web page code may be utilized as developed.

The web page code is retrieved by a computer system 60 or electronic system 100 via the Internet, wireless network or other communications channel utilizing a conventional web browser such as but not limited to NETSCAPE or MICROSOFT INTERNET EXPLORER. An individual using the computer system 60 enters the URL (Uniform Resource Locator) identifying the web page to retrieve the web page code associated with the desired web page.

Figure 13:
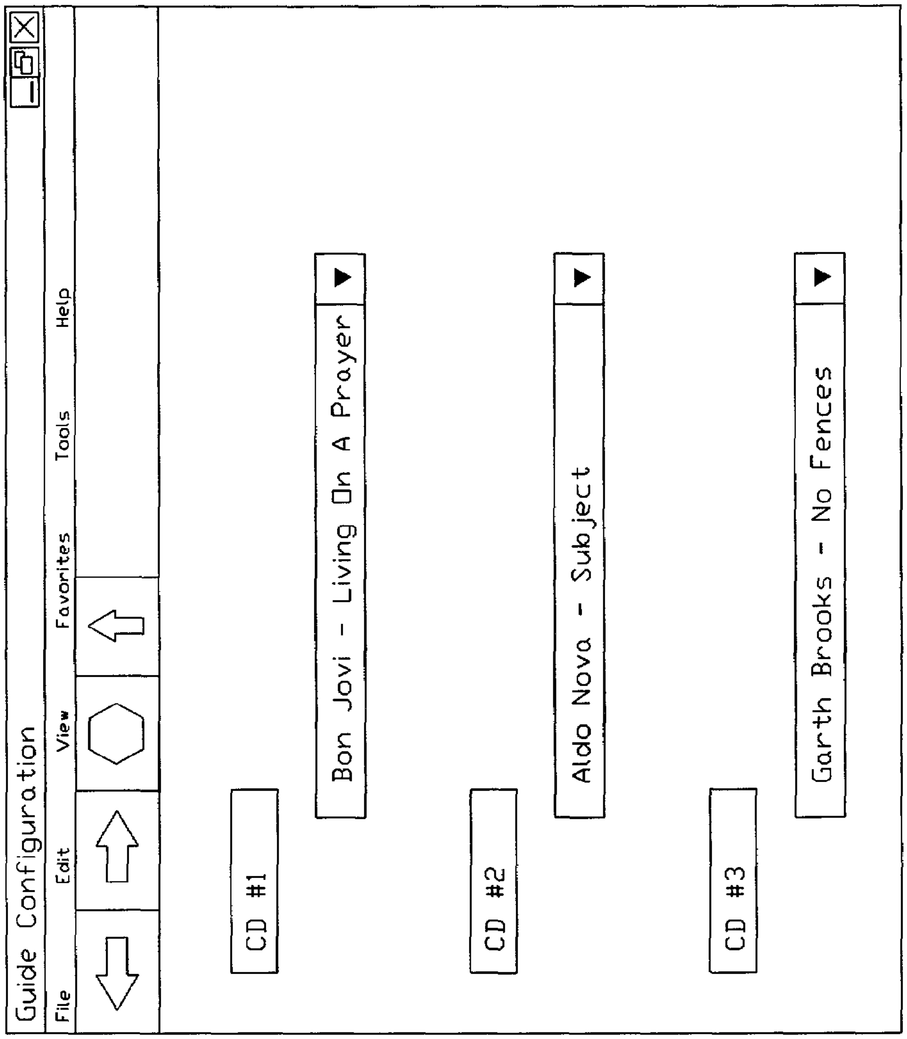
FIG. 13 is an illustration of a web page for entering media information into.

As shown in FIG. 13 of the drawings, at least one of the web pages associated with the control station 40 allows for the direct entry of information such as media information. More particularly, information relating to the type of media (e.g. video tape, compact disc, DVD, tape, etc.) and title information (e.g. artist name, album name, etc.) entered into the web page that are thereafter forwarded to the control station 40 for determination of the configuration data. Various other designs of web pages may be utilized to receive various types of information as can be appreciated by one skilled in the art.

D. Control Station

The control station 40 is in communication with the Internet 130 via various well-known means. The control station 40 is preferably accessed by users via a web page which allows the users to identify themselves and modify user settings. The user may input various conditions and requirements regarding the external electronic devices 12 that the remote control is to control along with the media. The user settings and data input may be modified at anytime via the web page or other means.

The control station 40 is in communication with one or more programming stations 50 that provide updated media information to the control station 40. The media information is basically comprised of media type, title, and other relevant information. It can be appreciated that additional types of media information may be received and stored by the control station 40.

The control station 40 maintains a database that allows for the determination of a media contained within a user's home entertainment system. The database allows for the determination of what media is on the electronic devices 12. The control station 40 is preferably updated at periodic intervals regarding updated information regarding new media on the market along with updated television programming listings.

Figure 14:
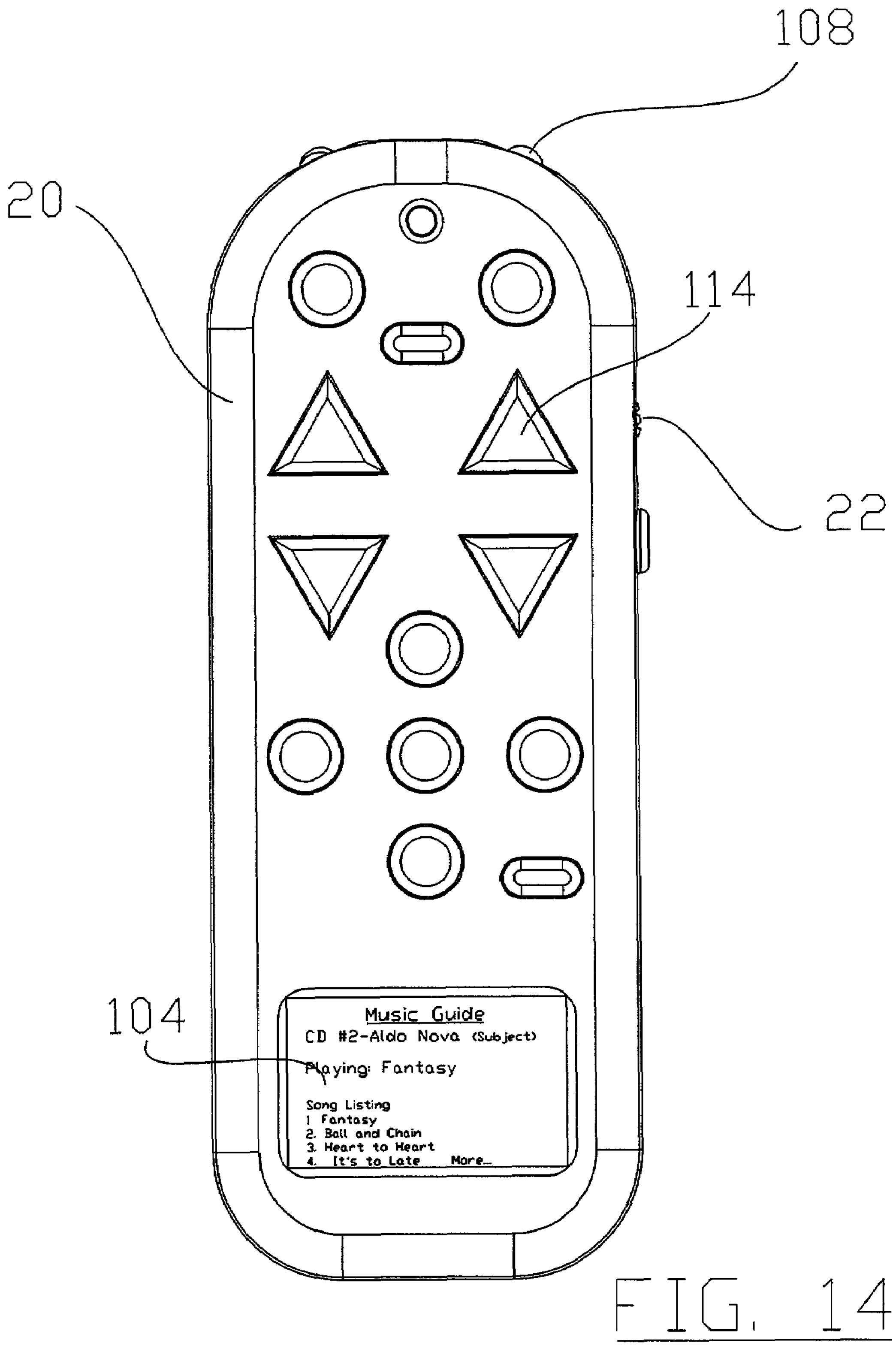
FIG. 14 is a top view of the remote control showing the music guide being displayed on the display.
Figure 15:
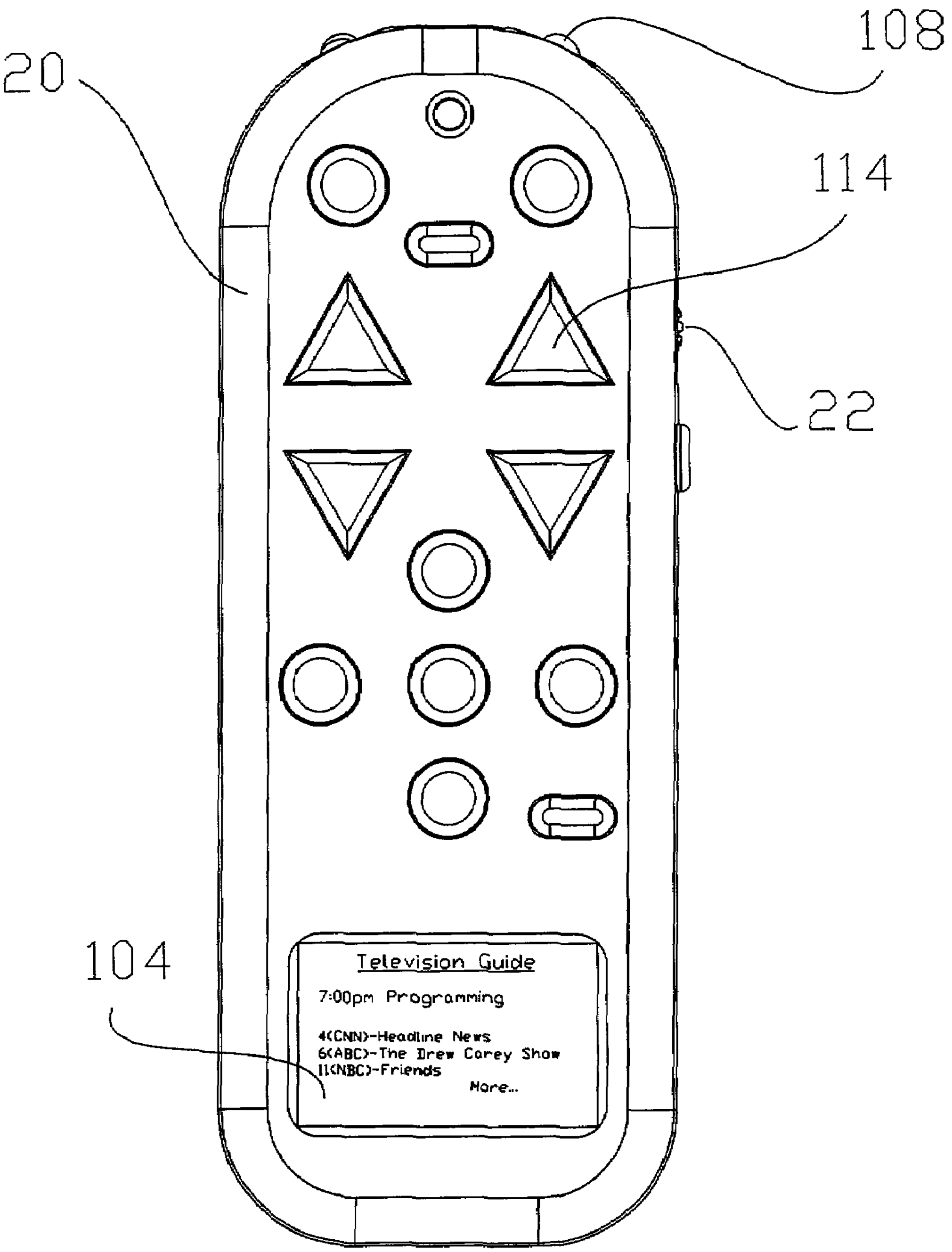
FIG. 15 is a top view of the remote control showing the television guide being displayed on the display.

E. Media Guide the "media guide" is controlled by the electronic system 100 and displayed by the display 104 for the user to view. The media guide provides a listing of the media (e.g. compact discs, DVDs, video tapes) for the user to view. An example of for the media guide is illustrated in FIGS. 14 and 15 of the drawings.

The user may utilize the keypad 114 to "scroll" and "select" the media they are interested in watching and/or listening too. For example, a listing of television programming may be displayed for a specific period of time wherein the user may select a displayed programming event to watch. When the user selects the desired programming, the electronic system 100 transmits a signal to the appropriate external electronic devices 12 to achieve the desired setting for the electronic devices 12. The media guide may also include additional information relating to the media to be watched such as a description of a movie listed on the media guide and related information.

For example, when the user activates the television listing, it is displayed correctly for the current time. The user can scroll to a show of interest shown on the screen. When the user "selects" that show, the electronic device determines what channel change signal needs to be sent to the television to display that show. When the user activates the television listing, the user can scroll forward in time and select a show that they are interested in recording. When the user "selects" that show, the electronic system determines what date and time that show is on and sends the appropriate control signals to the VCR to program the VCR to record that show. When the user activates the listing of their CDs and CD track names, the user can scroll to a song of interest shown on the screen. When the user selects that song, the electronic device 12 determines what CD and track change signals need to be sent to the CD player.

F. Media Information

Media information is displayed in further detail upon the display 104. Media information for music may include but is not limited to title, artist and track information. Media information for DVDs may include but is not limited to title, actors and type of movie (e.g. comedy, drama, horror, etc.). As can be appreciated, various types of media information may be utilized within the present invention for the user to utilize within their remote control.

G. Program Warning

The electronic system 100 is capable of being programmed to "warn" the user of an upcoming media event such as the showing of the television show FRIENDS on NBC. The user utilizes the keypad 114 to select the desired show and then enters the required information for the electronic system to determine when to sound an alarm. Various other features may be programmed into the electronic system 100 to assist the user in enjoying all forms of media.

H. Operation

To configure the electronic system 100, the user may enter the media information directly into the electronic system 100. The user may enter all or a portion of the media information. If only a portion of the media information is entered, such as the album title, the electronic system 100 may then be connected to the control station 40 for downloading the remaining media information such as artist name and track information. The user may also directly enter the media information into the web page of the control station 40 as shown in FIG. 13. After the control station 40 has received the necessary information to determine the media desired to be listed within the media guide, the control station 40 searches for information relating to the media information input by the user. The control station 40 thereafter generates configuration data which is thereafter transferred to the electronic system 100 via the Internet 130. The electronic system 100 stores the configuration data within for generating the media guide upon the display 104 when desired by the user. The media guide is displayed listing information relating to music, television, DVD and other media. The media guide preferably lists the items in a structured format for the user to view and select as shown in FIGS. 14 and 15 of the drawings. It can be appreciated that the structure and function of the media guide may be comprised of various guide structures that are commonly utilized within the media industry and are hereby incorporated by reference into this patent application.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A method of using a remote control multimedia content listing system, said method comprising the steps of:

entering a media record into an electronic system of a remote control device, wherein said electronic system of said remote control device is web enabled and is capable of controlling one or more electronic devices;

storing said media record within said electronic system of said remote control device;

repeating the entering and the storing steps for additional media records;

uploading said media record from the electronic system of said remote control device via a wireless network connection to a network;

transferring said media record from the network to a network-control station;

determining in said network-control station an identity of media that corresponds with each said media record;

generating in said network-control station a configuration data for said electronic system of said remote control device that allows said electronic system of said remote control device to display a media guide, and wherein said configuration data determines a set of control signals that are configured to be transmitted by said electronic system of said remote control device to at least one electronic device based upon a media selection for activating said media selection;

transferring said configuration data from said network-control station to said network;

transferring said configuration data from said network wirelessly to the electronic system of said remote control device;

generating in the remote control an updated media guide based on the configuration data generated in the network-control station and received from the network;

displaying on a display of the remote control the updated media guide for user selection of a piece of media for play by one or more of the electronic devices;

automatically updating said configuration data if new configuration data is available;

automatically transferring said updated-configuration data to said electronic system of said remote control device if said electronic system is operatively coupled to said network-control station;

the electronic system of the remote control device issuing an audible warning for an upcoming media presentation associated with the media record.

2. The method of using a remote control multimedia content listing system of claim 1, including the step of: storing said configuration data within said electronic system of said remote control device.

3. The method of using a remote control multimedia content listing system of claim 2, including the step of: displaying said media guide upon said a display of said remote control device.

4. The method of claim 1, wherein the media presentation is a television program.

5. The method of claim 4, wherein the step of entering a media record into the electronic system of the remote control device includes a user entering the media record into the electronic system of the remote control device using at least one of a keypad, a mouse, a trackball, a keyboard, and a jog switch.

6. The method of claim 1, wherein the mouse, the trackball, the keyboard, and the jog switch are configured to control a pointer displayed on a screen of the electronic device.

7. The method of claim 1, wherein the electronic system of the remote control device is web enabled, and wherein the step of uploading includes uploading the media record from the electronic system of the remote control device to a network operatively coupled to the control station.

8. The method of claim 7, wherein the electronic system of the remote control device is a remote control.

9. A method of using a remote control multimedia content listing system, said method comprising the steps of:

accessing a web page of a control station;

inputting media data into said web page; and generating a configuration data for said media data for an electronic system of a remote control device that allows said electronic system to display a media guide, for said media data, wherein said electronic system of said remote control device is configured to control one or more electronic devices;

transferring said configuration data from said control station through a network and a wireless network link to said electronic system of said remote control device;

said configuration data determining a set of control signals that are transmitted by said electronic system of said remote control device to at least one electronic device based upon a media selection for activating said media selection;

automatically updating said configuration data if new configuration data is available; and automatically transferring said updated-configuration data to said electronic system of said remote control device if said electronic system is operatively coupled to said control station;

generating in the remote control an updated media guide based on the configuration data generated in the network-control station and received from the network;

displaying on a display of the remote control the updated media guide for user selection of a piece of media for play by one or more of the electronic devices; and the electronic system of the remote control device issuing an audible warning for an upcoming presentation of a media presentation associated with the media guide or the updated media guide.

10. The method of using a remote control multimedia content listing system of claim 9, including the step of: storing said configuration data within said electronic system of said remote control device.

11. The method of using a remote control multimedia content listing system of claim 10, including the step of: displaying said media guide upon said display.

12. The method of using a remote control multimedia content listing system of claim 9, wherein said media guide includes a television guide.

13. The method of using a remote control multimedia content listing system of claim 9, wherein said media guide includes a music guide.

14. The method of using a remote control multimedia content listing system of claim 13, wherein said music guide is comprised of information relating to music media contained within a user's home stereo system.

15. The method of using a remote control multimedia content listing system of claim 13, wherein said music guide is comprised of information relating to compact discs contained within a user's home stereo system.

16. The method of using a remote control multimedia content listing system of claim 15, including the steps of:

selecting a media event to be displayed or listened to by said user;

transmitting a control signal to an electronic device to play said media event.

17. The method of claim 9, wherein the media presentation is a television program.

* * * * *